(12) United States Patent
Tanio

(10) Patent No.: US 11,407,602 B2
(45) Date of Patent: Aug. 9, 2022

(54) IMAGE FORMING APPARATUS

(71) Applicant: KYOCERA Document Solutions Inc., Osaka (JP)

(72) Inventor: Koji Tanio, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 139 days.

(21) Appl. No.: 17/032,349

(22) Filed: Sep. 25, 2020

(65) Prior Publication Data

US 2021/0094782 A1   Apr. 1, 2021

(30) Foreign Application Priority Data

Sep. 30, 2019  (JP) .............................. JP2019-178543

(51) Int. Cl.
*B65H 1/26*   (2006.01)
(52) U.S. Cl.
CPC ......... *B65H 1/266* (2013.01); *B65H 2402/44* (2013.01); *B65H 2402/64* (2013.01); *B65H 2405/121* (2013.01); *B65H 2551/14* (2013.01)
(58) Field of Classification Search
CPC ........................... B65H 1/266; B65H 2402/64; B65H 2551/14; B65H 2553/25; B65H 2405/121; B41J 29/54; B41J 29/56; G07D 11/125; E07B 73/0082; G03G 2221/1654
See application file for complete search history.

(56) References Cited

U.S. PATENT DOCUMENTS

| | | | | |
|---|---|---|---|---|
| 7,546,061 B2 * | 6/2009 | Kurokawa | .......... | E05B 73/0082 |
| | | | | 101/494 |
| 9,718,631 B2 * | 8/2017 | Eguchi | ................... | B65H 1/266 |
| 9,809,403 B2 * | 11/2017 | Yaginuma | .............. | B65H 1/266 |
| 10,179,713 B2 * | 1/2019 | Kuno | ....................... | B65H 1/04 |

FOREIGN PATENT DOCUMENTS

JP   2010-155710   7/2010

* cited by examiner

*Primary Examiner* — Jeremy R Severson
(74) *Attorney, Agent, or Firm* — Wenderoth, Lind & Ponack, L.L.P.

(57) ABSTRACT

An image forming apparatus includes a sheet feed cassette. The sheet feed cassette has a cylinder lock having a cylinder, and a turning unit coupled to the cylinder to be rotatable integrally with the cylinder. A switch switching part of the turning unit is configured to switch a power switch such that the power switch is in an ON state when an inner cylinder of the cylinder lock is at an unlocked position, and the power switch is in an OFF state when the inner cylinder is at a locked position. A cassette locking part of the turning unit is configured to place a sheet feed cassette of a standard sheet feeder in an unlocked state when the inner cylinder of the cylinder lock is at the unlocked position and place the sheet feed cassette in a locked state when the inner cylinder is at the locked position.

5 Claims, 8 Drawing Sheets

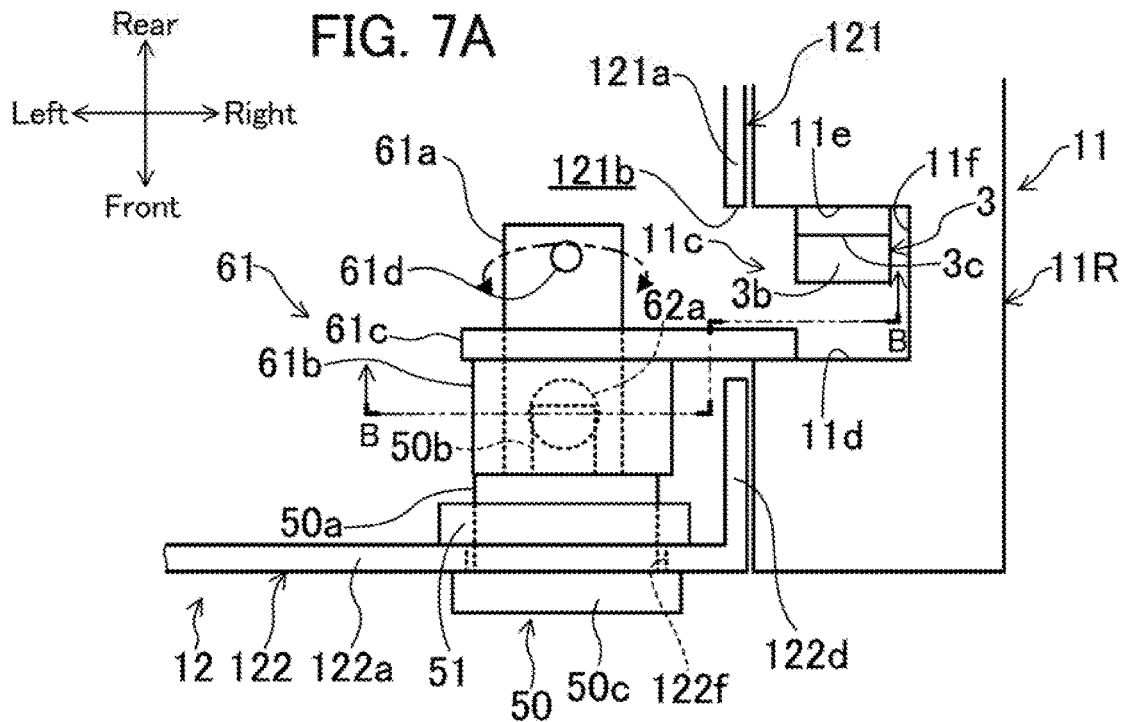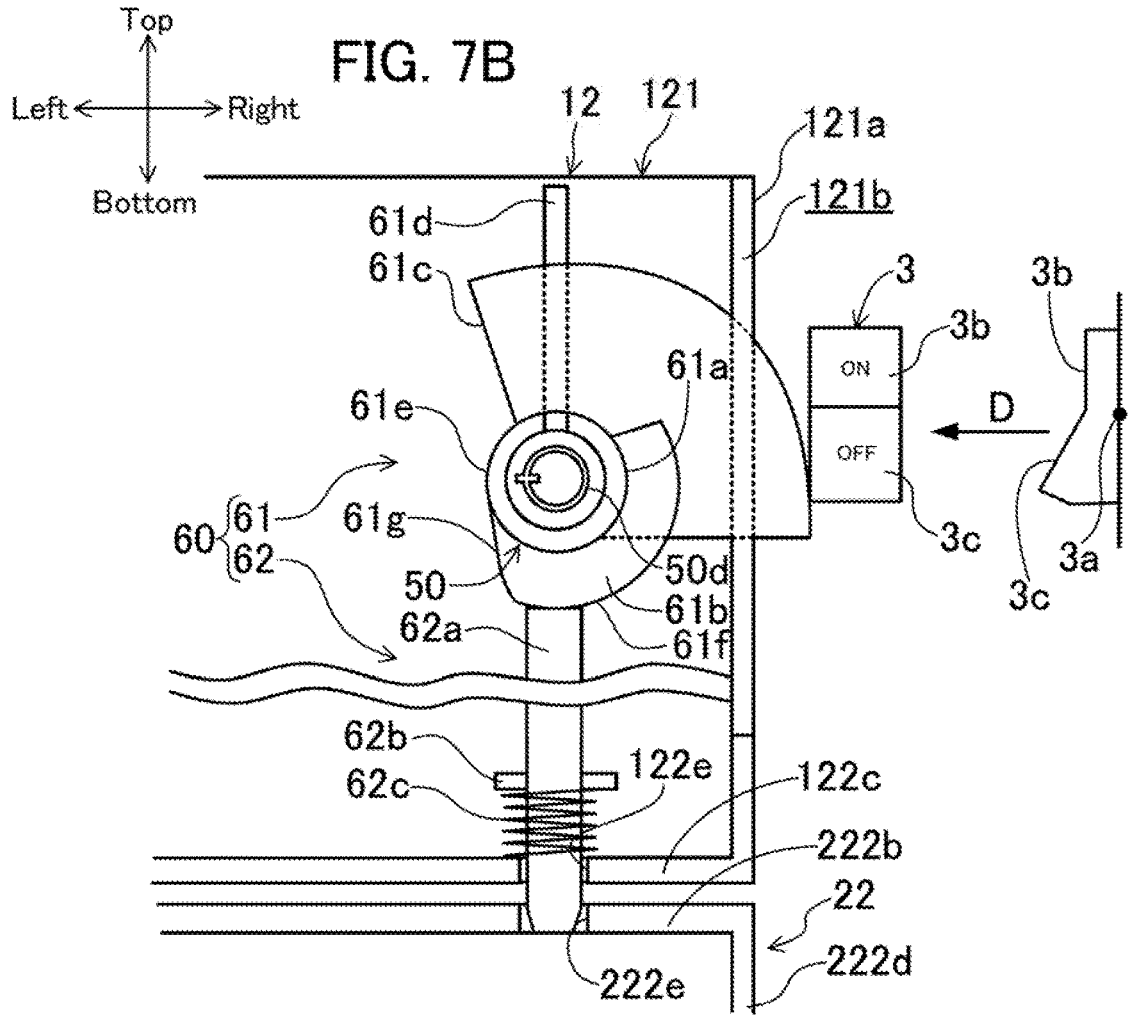

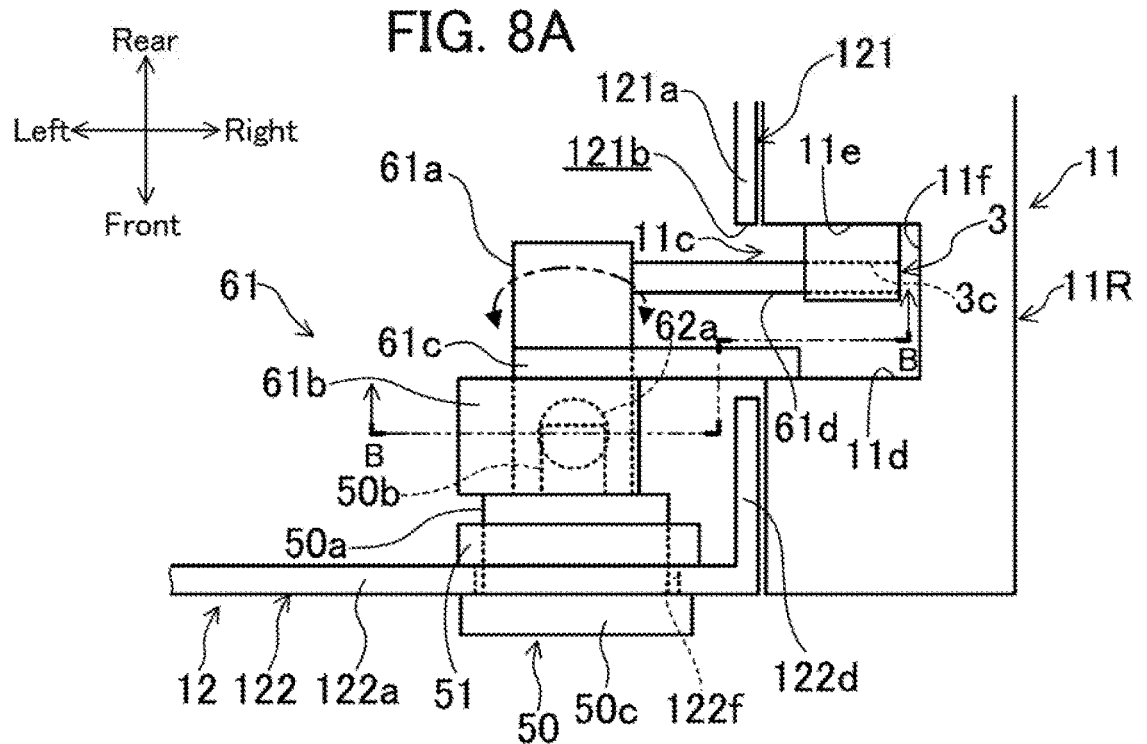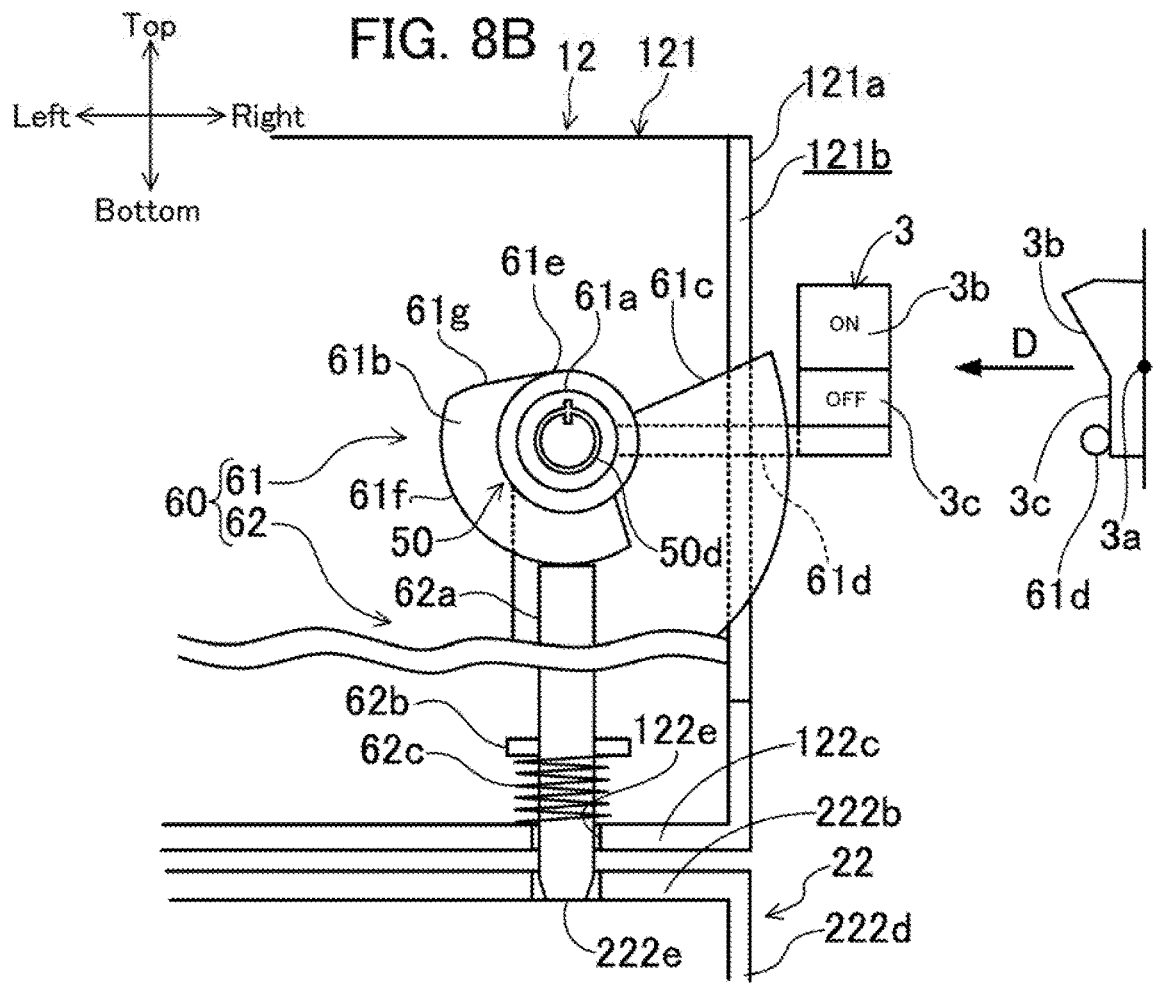

IMAGE FORMING APPARATUS

CROSS-REFERENCE TO RELATED APPLICATION(S)

This application is based upon and claims the benefit of priority from Japanese Patent Application No. 2019-178543 filed on Sep. 30, 2019, the entire contents of which are incorporated herein by reference.

BACKGROUND

The technology disclosed herein relates to an image forming apparatus.

A sheet feeder for an image forming apparatus has been proposed which has a locking mechanism, e.g., for the purpose of protecting sheets contained in a sheet feed cassette. Such a sheet feeder uses, for example, a cylinder key as the locking mechanism. A locking mechanism using a cylinder key is configured such that, by a user inserting a key into a cylinder and rotating the cylinder, a cam interlocking with the cylinder is rotated and the sheet feed cassette is thereby locked.

SUMMARY

As aspect of the present disclosure provides an image forming apparatus includes an image forming apparatus body and a sheet feed cassette. The image forming apparatus body has a power switch. The sheet feed cassette is housed in the image forming apparatus body such that the sheet feed cassette is able to be pulled out from the image forming apparatus body.

The image forming apparatus has an outer cylinder, an inner cylinder, and a turning unit. The outer cylinder is mounted on a wall of the sheet feed cassette located on a front side in a pulled-out direction of the sheet feed cassette and forms a part of a cylinder lock. The inner cylinder is turnably held on an inner peripheral surface of the outer cylinder and configured to be rotated between a first position and a second position about an axis of the outer cylinder by a key inserted into the inner cylinder from the front side in the pulled-out direction. The turning unit is coupled to the inner cylinder inside the sheet feed cassette such that the turning unit is able to rotate integrally with the inner cylinder.

The turning unit includes a switch switching part and a cassette locking part. The switch switching part is configured to turn in conjunction with rotational motion of the inner cylinder rotated by the key to switch the power switch between an ON state for supplying power to the image forming apparatus body and an OFF state for stopping supply of power to the image forming apparatus body. The cassette locking part is configured to turn in conjunction with rotational motion of the inner cylinder rotated by the key to switch the sheet feed cassette between a locked state in which the sheet feed cassette is locked such that it cannot be pulled out from the image forming apparatus body and an unlocked state in which the sheet feed cassette is unlocked.

The switch switching part is configured to switch the power switch such that the power switch is in the ON state when the inner cylinder is at the first position and the power switch is in the OFF state when the inner cylinder is at the second position. The cassette locking part is configured to place the sheet feed cassette in the unlocked state when the inner cylinder is at the first position and place the sheet feed cassette in the locked state when the inner cylinder is at the second position.

BRIEF DESCRIPTION OF THE DRAWINGS

FIG. 7A corresponds to FIG. 6A, which shows a state where the inner cylinder of the cylinder lock is at an intermediate position;

FIG. 7B is a sectional view taken along line B-B in FIG. 7A;

FIG. 8A corresponds to FIG. 6A, which shows a state where the inner cylinder of the cylinder lock is at a locked position; and FIG. 8B is a sectional view taken along line B-B in FIG. 8A.

DETAILED DESCRIPTION

Hereinafter, an example embodiment of the present disclosure will be described in detail on the basis of the drawings. It should be understood that the technology disclosed herein is not limited to the embodiment described below.

Figure 1:
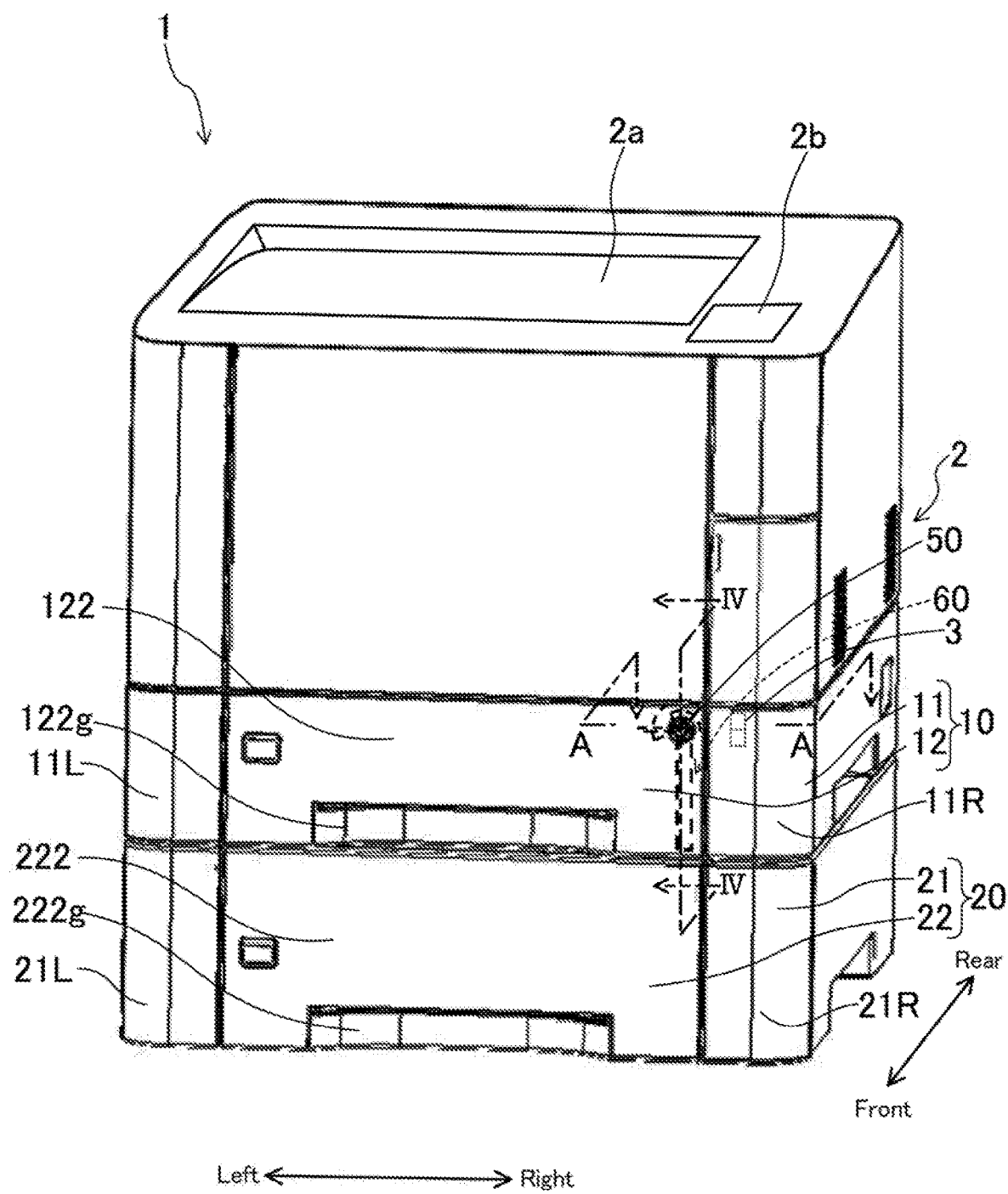
FIG. 1 is a perspective view of an appearance of an image forming apparatus according to an embodiment of the present disclosure.

FIG. 1 is a perspective view of an appearance of an image forming apparatus 1 according to an embodiment of the present disclosure. Note that the terms "front", "rear", "left", and "right" in the following description are defined with respect to the image forming apparatus 1 and conform to the directional axis definition shown in the figures.

The image forming apparatus 1 includes an image forming apparatus body 2. The image forming apparatus body 2 has a sheet feeder (hereinafter, referred to as "standard sheet feeder") 10 at a bottom end thereof. The standard sheet feeder 10 is undetachably secured to the image forming apparatus 1. An optional sheet feeder 20 is detachably attached to the bottom of the standard sheet feeder 10.

The image forming apparatus body 2 houses an image forming unit that prints an image on a sheet (e.g., a paper sheet or an OHP sheet) fed from the standard sheet feeder 10 or the optional sheet feeder 20, a conveying mechanism that discharges the sheet having the image printed thereon to an exit tray 2a, and other components. Examples of the method of printing in the image forming unit include electrophotographic printing and ink-jet printing.

The exit tray 2a is formed by making a recess in a top surface of the image forming apparatus body 2. The image forming apparatus body 2 has an operating unit 2*b* provided on a front and right corner of the top surface thereof, which a user uses to carry out operations such as setting of printing conditions and giving of a print starting instruction. The operating unit 2*b* is composed of, for example, push-type operation keys or a liquid crystal touch panel.

The standard sheet feeder 10 includes a body case 11 that forms the bottom end of the image forming apparatus body 2, and a sheet feed cassette 12 that is housed in the body case 11 such that the sheet feed cassette 12 is able to be pulled out to the front side from the body case 11. The sheet feed cassette 12 contains sheets (e.g., paper sheets or OHP sheets) stacked in a bundle. The body case 11 houses, at a rear end thereof, a sheet feeding mechanism (illustration omitted) that separates the sheets contained in the sheet feed cassette 12 from one another and feeds the sheets one by one toward the image forming apparatus body 2. The sheet feed cassette 12 has a cylinder lock 50 provided on a right end of a front end surface thereof. The sheet feed cassette 12 has an interlocking mechanism 60 provided therein that operates in conjunction with rotation of the cylinder lock 50. The body case 11 houses a power switch 3 for the image forming apparatus 1, which is located adjacently to the interlocking mechanism 60 at the right side of the interlocking mechanism 60.

The optional sheet feeder 20 is additionally attached to the bottom of the standard sheet feeder 10. The optional sheet feeder 20 includes a body case 21 that is formed in a rectangular box shape, and a sheet feed cassette 22 (see FIG. 1) that is housed in the body case 21 such that the sheet feed cassette 22 is able to be pulled out to the front side from the body case 21. The sheet feed cassette 22 has sheets set therein that are stacked in a bundle. The body case 21 houses, at a rear end thereof, a sheet feeding mechanism (illustration omitted) that separates the sheets contained in the sheet feed cassette 22 from one another and feeds the sheets one by one toward the image forming apparatus body 2.

[Configuration of Standard Sheet Feeder 10]

Figure 2:
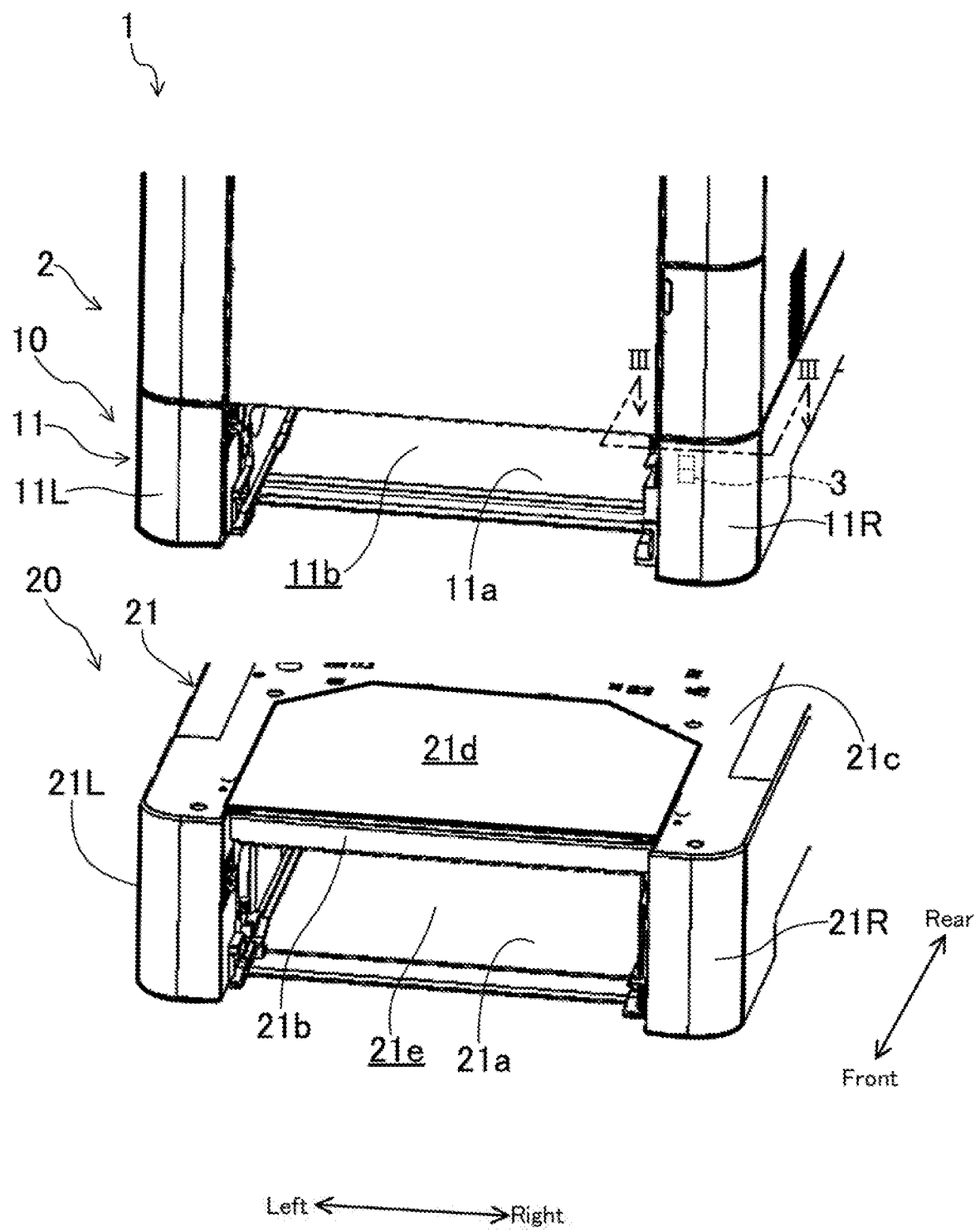
FIG. 2 is a perspective view showing a state where sheet feed cassettes are removed from a standard sheet feeder and an optional sheet feeder of the image forming apparatus.

As illustrated in FIG. 2, the body case 11 of the standard sheet feeder 10 has a left case part 11L and a right case part 11R that are spaced from each other in the left-right direction. Between the left case part 11L and the right case part 11R, a receiving space 11*b* that receives the sheet feed cassette 12 is formed. A bottom plate 11*a* connects lower ends of the left case part 11L and right case part 11R.

Figure 3A:
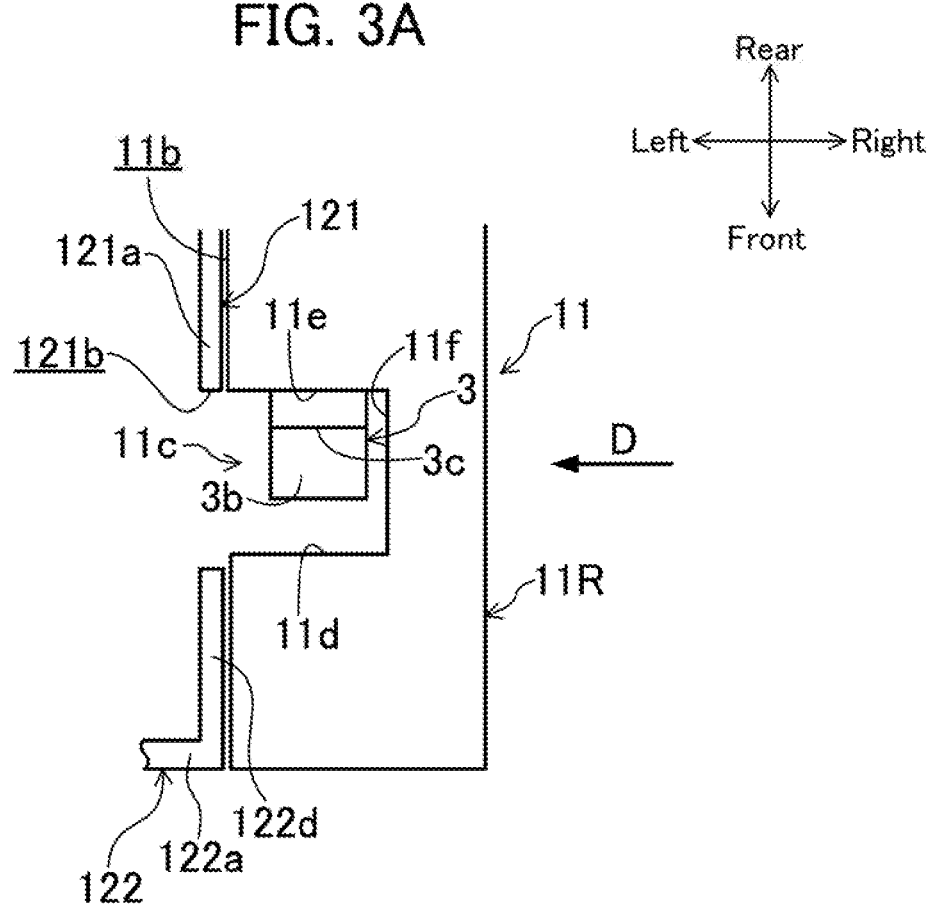
FIG. 3A is a sectional view taken along line III-III in FIG. 2.

As illustrated in FIG. 3A, a switch receiving recess 11*c* that receives the power switch 3 is formed in a wall of the right case part 11R facing the receiving space 11*b*. As viewed from the upper side, the switch receiving recess 11*c* is formed in a square U-shape that is opened to the receiving space 11*b* side (the left side). More specifically, the switch receiving recess 11*c* has a front wall 11*d* and a rear wall 11*e* that are opposed to each other in the front-rear direction, and a right wall 11*f* that connects right edges of the front wall 11*d* and rear wall 11*e*. The power switch 3 is mounted on the rear wall 11*e* of the switch receiving recess 11*c*.

Figure 3B:
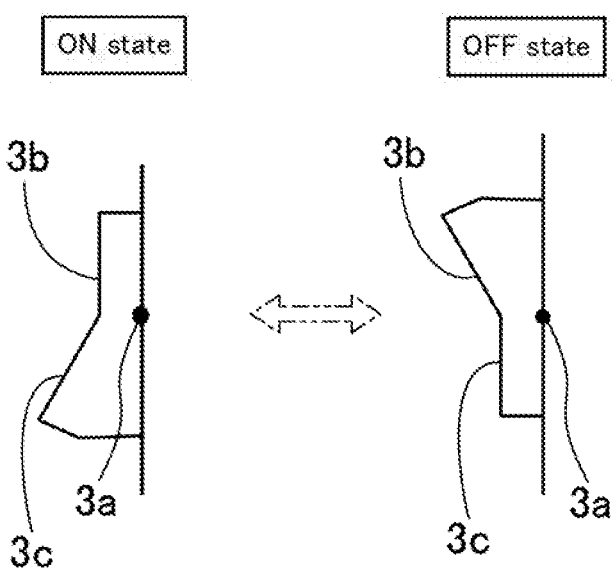
FIG. 3B illustrates an ON state and an OFF state of a power switch as viewed in arrow D direction in FIG. 3A.

As illustrated in FIG. 3B, the power switch 3 is configured to turn on and off the image forming apparatus 1 by seesawing about a support shaft 3*a*. Specifically, the power switch 3 has an ON-side pressed surface 3*b* and an OFF-side pressed surface 3*c*. The OFF-side pressed surface 3*c* is located on the lower side of the ON-side pressed surface 3*b*. The ON-side pressed surface 3*b* and the OFF-side pressed surface 3*c* intersect with each other to form a predetermined angle less than 180° (for example, an angle between 150° and 160°) between their pressed faces. Once the OFF-side pressed surface 3*c* is pressed, the OFF-side pressed surface 3*c* is brought into a vertical position and the ON-side pressed surface 3*b* is inclined slightly to the front side toward the upper side, as shown in the right diagram of FIG. 3B. This state is an OFF state of the power switch 3. When the power switch 3 is in the OFF state, supply of power to the image forming apparatus 1 is stopped by a switching element (not illustrated) that operates in conjunction with the power switch 3. Once the ON-side pressed surface 3*b* of the power switch 3 is pressed, the ON-side pressed surface 3*b* is brought into a vertical position and the OFF-side pressed surface 3*c* is inclined slightly to the front side toward the lower side, as shown in the left diagram of FIG. 3B. This state is an ON state of the power switch 3. When the power switch 3 is in the ON state, power is supplied to the image forming apparatus 1 through a switching element (not illustrated) that operates in conjunction with the power switch 3.

Figure 4:
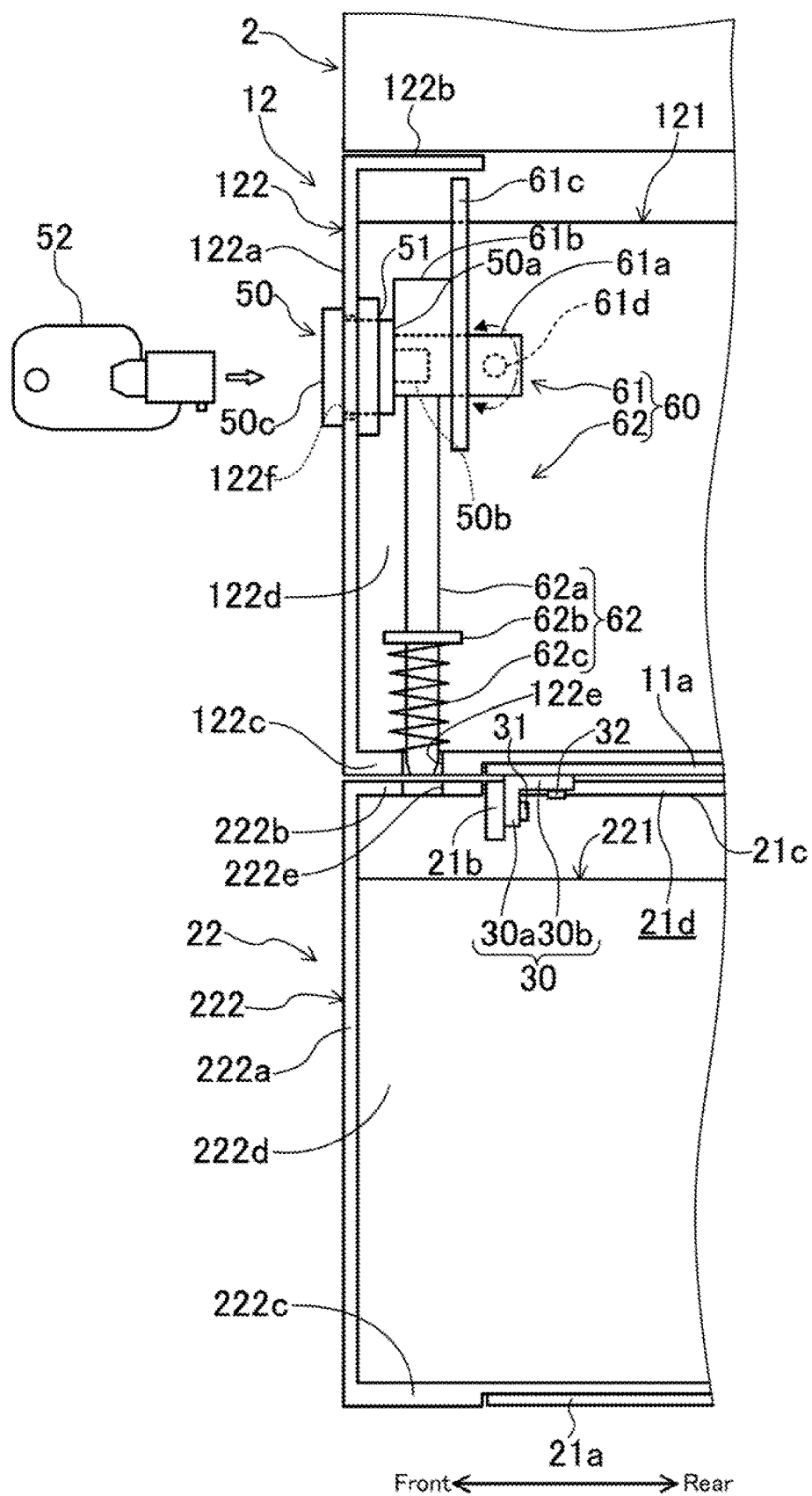
FIG. 4 is a sectional view taken along line IV-IV in FIG. 1.

As illustrated in FIG. 4, the sheet feed cassette 12 of the standard sheet feeder 10 has a cassette body 121 and a front decorated board 122. The cassette body 121 is formed in a flat rectangular box shape with the upper and front sides opened. The front decorated board 122 is arranged to cover the front face of the cassette body 121. More specifically, the front decorated board 122 has a front wall 122*a*, an upper wall 122*b*, a lower wall 122*c*, and left and right walls 122*d* (only the left wall is illustrated in FIG. 4). The front wall 122*a* is formed in a rectangular shape extending in the left-right direction. The upper wall 122*b* and the lower wall 122*c* respectively protrude rearward from upper and lower edges of the front wall 122*a*. The left and right walls 122*d* respectively protrude rearward from left and right edges of the front wall 122*a*. The front wall 122*a* has a handle part 122*g* (illustrated only in FIG. 1) formed in a front-side surface thereof, which is formed in a recessed shape such that a user can hold it by hand. When the sheet feed cassette 12 is in the housed state (the state shown in FIG. 4), a rear end surface of the lower wall 122*c* of the front decorated board 122 is in contact with a front end surface of the bottom plate 11*a* of the body case 11.

The aforementioned cylinder lock 50 is mounted on an upper right corner portion of the front decorated board 122, and the interlocking mechanism 60 is arranged behind the cylinder lock 50. The lower wall 122*c* of the front decorated board 122 has a through hole 122*e* formed therein through which a locking shaft 62*a* is inserted when the interlocking mechanism 60 operates. Details of the cylinder lock 50 and interlocking mechanism 60 are described later.

As illustrated in FIG. 3A, the right wall 121*a* of the cassette body 121 has a rectangular cutout 121*b* formed at a portion adjacent to the switch receiving recess 11*c*, which is opened to the upper side. The space inside the cassette body 121 and the space inside the switch receiving recess 11*c* communicate with each other through the cutout 121*b*.

[Configuration of Optional Sheet Feeder 20]

As illustrated in FIG. 2, the body case 21 of the optional sheet feeder 20 has a left case part 21L, a right case part 21R, a bottom plate 21*a*, an upper-end connecting frame 21*b*, and a top plate 21*c*. The bottom plate 21*a* connects lower ends of the left case part 21L and right case part 21R. The top plate 21*c* is formed to extend between top surfaces of the left case part 21L and right case part 21R. The upper-end connecting frame 21*b* connects front-side ends of upper ends of the left case part 21L and right case part 21R. The top plate 21*c* has a trapezoidal opening 21*d* formed therein at a portion located on the rear side of the upper-end connecting frame 21*b*. The space surrounded by the left case part 21L, the right case part 21R, the top plate 21c, and the bottom plate 21a forms a receiving space 21e that receives the sheet feed cassette 12.

As illustrated in FIG. 4, the sheet feed cassette 22 of the optional sheet feeder 20 has a cassette body 221 and a front decorated board 222. The cassette body 221 is formed in a flat rectangular box shape with the upper and front sides opened. The front decorated board 222 is arranged to cover the front face of the cassette body 221. More specifically, the front decorated board 222 has a front wall 222a, an upper wall 222b, a lower wall 222c, and left and right walls 222d (only the left wall is illustrated in FIG. 4). The front wall 222a is formed in a rectangular shape extending in the left-right direction. The upper wall 222b and the lower wall 222c respectively protrude rearward from upper and lower edges of the front wall 222a. The left and right walls 222d respectively protrude rearward from left and right edges of the front wall 222a. The front wall 222a has a handle part 222g (illustrated only in FIG. 1) formed in a front-side surface thereof, which is formed in a recessed shape such that a user can hold it by hand. When the sheet feed cassette 22 is in the housed state (the state shown in FIG. 4), a rear end surface of the upper wall 222b of the front decorated board 222 is in contact with the upper-end connecting frame 21b of the body case 21, and a rear end surface of the lower wall 222c of the front decorated board 222 is in contact with a front end surface of the bottom plate 21a of the body case 21. The upper wall 222b of the front decorated board 222 has an engagement hole 222e (example of engaged portion) formed therein that is engaged by a lower end of the locking shaft 62a of the interlocking mechanism 60 when the locking shaft 62a is moved downward.

[Structure for Fixing Optional Sheet Feeder 20 to Image Forming Apparatus Body 2]

The optional sheet feeder 20 and the image forming apparatus body 2 are fixed together by a pair of coupling members 30 (only the right coupling member is illustrated in FIG. 4). Each coupling member 30 has a vertical plate part 30a and a horizontal plate part 30b that protrudes rearward from an upper edge of the vertical plate part 30a. The vertical plate parts 30a of the pair of coupling members 30 are respectively fixed to ends in the left-right direction of the upper-end connecting frame 21b of the optional sheet feeder 20 by bolts 31. The horizontal plate parts 30b of the pair of coupling members 30 are respectively fixed to the bottom plate 11a of the body case 11 of the standard sheet feeder 10 (i.e., to a bottom surface of the image forming apparatus body 2) by bolts 32. A user cannot access or reach the bolts 31, 32 unless the sheet feed cassette 22 is pulled out and removed from the optional sheet feeder 20.

[Configurations of Cylinder Lock 50 and Interlocking Mechanism 60]

Figure 5:
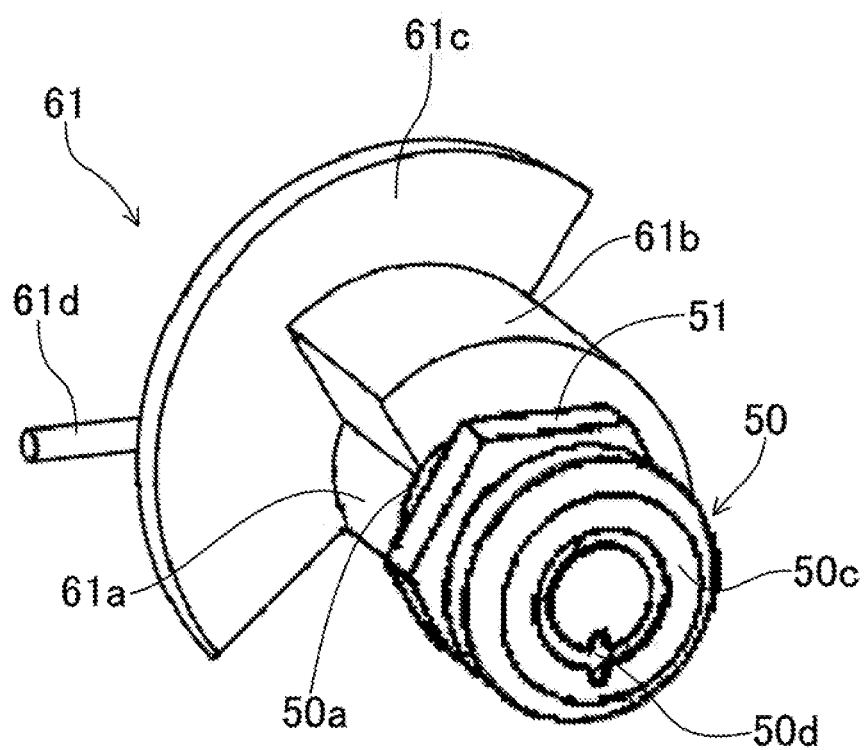
FIG. 5 is perspective view illustrating a cylinder lock and a turning unit coupled to an inner cylinder of the cylinder lock.

Next, the cylinder lock 50 and interlocking mechanism 60 that are provided on the sheet feed cassette 12 of the standard sheet feeder 10 are described with reference to FIGS. 4 to 6.

As illustrated in FIG. 4, the cylinder lock 50 has a well-known mechanism that includes an outer cylinder 50a and an inner cylinder 50b. The outer cylinder 50a is mounted on the front wall 122a (a wall located on the front side in the pulled-out direction) of the front decorated board 122. The outer cylinder 50a supports the inner cylinder 50b such that the inner cylinder 50b is able to rotate. When a key 52 (see FIG. 5) is inserted into a keyhole 50d of the cylinder lock 50, end surfaces of pins arranged to extend from the outer cylinder 50a to the inner cylinder 50b align with the shear line so that the inner cylinder 50b becomes rotatable together with the key 52.

The inner cylinder 50b of the cylinder lock 50 is able to turn between an unlocked position as a first position (the position shown in FIGS. 4 and 6) and a locked position as a second position. In this example embodiment, the locked position is set at a position which is reached when the inner cylinder 50b is rotated by 180° in the clockwise direction from the unlocked position by the key 52. The inner cylinder 50b of the cylinder lock 50 can also be turned to an intermediate position besides the unlocked position and the locked position. The intermediate position is set at, for example, a position which is reached when the inner cylinder 50b is rotated by 90° in the clockwise direction from the unlocked position by the key 52.

The outer cylinder 50a has a large-diameter portion 50c at its end located on the keyhole 50d side, which has a larger diameter than the other portions. The outer cylinder 50a has a male screw formed on an outer peripheral surface thereof. The front wall 122a of the front decorated board 122 has a mounting hole 122f (see FIG. 4) formed therein for mounting the outer cylinder 50a therein. The cylinder lock 50 is mounted such that the outer cylinder 50a is inserted through the mounting hole 122f and a bearing surface of the large-diameter portion 50c is in contact with the front-side surface of the front wall 122a. In this state, a nut 51 is screwed and tightened on the male screw formed on the outer peripheral surface of the outer cylinder 50a so that the outer cylinder 50a is fixed to the front wall 122a.

The inner cylinder 50b of the cylinder lock 50 is coupled to the interlocking mechanism 60. The interlocking mechanism 60 includes a turning unit 61 and a driven unit 62.

The turning unit 61 rotates together with the inner cylinder 50b of the cylinder lock 50 in accordance with rotation of the key 52. Specifically, the truing unit 61 includes a coupling shaft 61a, a rotating cam 61b, a locking plate 61c, and a switch switching bar 61d. The locking plate 61c is an example of the cassette locking part and the switch switching bar 61d is an example of the switch switching part.

The coupling shaft 61a is arranged coaxially with the inner cylinder 50b of the cylinder lock 50 and extends in the front-rear direction. A front end of the coupling shaft 61a is coupled with the inner cylinder 50b, for example by key linkage, such that the coupling shaft 61a is able to rotate integrally with the inner cylinder 50.

The rotating cam 61b is fixed to a front end portion of a peripheral surface of the coupling shaft 61a. As illustrated in FIG. 6B, the rotating cam 61b has a smallest-radius portion 61e, a largest-radius portion 61f, and an intermediate-radius portion 61g. The smallest-radius portion 61e is a portion having the smallest radius on the rotating cam 61b, and is flush with the peripheral surface of the coupling shaft 61a. That is to say, the smallest-radius portion 61e has a radius equal to the radius of the coupling shaft 61a. The largest-radius portion 61f is a portion having the largest radius on the rotating cam 61b, and is formed by an arcuate surface having a constant radius. The largest-radius portion 61f is formed to extend over an angle of 90° or more in the circumferential direction. The intermediate-radius portion 61e is formed to smoothly connect the smallest-radius portion 61e and the largest-radius portion 61f.

The locking plate 61c is fixed to a portion of the peripheral surface of the coupling shaft 61a adjacent to the rear face of the rotating cam 61b. The locking plate 61c is formed to have a substantially sector shape as viewed in the axial direction. The locking plate 61c is formed such that when the inner cylinder 50b of the cylinder lock 50 is turned to the intermediate position or the locked position by the key 52, a right end portion of the locking plate 61c and the front wall 11d of the switch receiving recess 11c (see FIG. 8A that is described later) overlap as viewed from the front side.

The switch switching bar 61d is composed of a cylindrical member having a circular cross section and is fixed to a portion of the peripheral surface of the coupling shaft 61a located on the rear side of the locking plate 61c. As shown in FIG. 6B, the switch switching bar 61d extends horizontally toward the left side from the peripheral surface of the coupling shaft 61a when the inner cylinder 50b of the cylinder lock 50 is at the unlocked position.

The driven unit 62 includes a locking shaft 62a. The locking shaft 62a extends vertically and an upper end surface thereof is in contact with a peripheral surface of the rotating cam 61b. The locking shaft 62a has a flange part 62b provided on a lower end portion thereof, which has a circular plate shape and protrudes radially outward. Between the flange part 62b and the lower wall 122c of the front decorated board 122, a biasing member 62c is provided. The biasing member 62c is composed of, for example, a compression coil spring inserted around a lower end of the locking shaft 62a. The biasing member 62b biases the flange part 62b together with the locking shaft 62a upward. The upper end surface of the locking shaft 62a is always pressed against the peripheral surface of the rotating cam 61b by a biasing force of the biasing member 62c.

[Operation of Interlocking Mechanism 60]

Next, operation of the interlocking mechanism 60 is described with reference to FIGS. 6 to 8. FIG. 6 shows a state where the inner cylinder 50b of the cylinder lock 50 is at the unlocked position. FIG. 7 shows a state where the inner cylinder 50b is at the intermediate position that is located between the unlocked position and the locked position. FIG. 8 shows a state where the inner cylinder 50b is at the locked position. In each of FIGS. 6 to 8, figure A illustrates a sectional view taken along line A-A in FIG. 1 and figure B illustrates a sectional view taken along line B-B in figure A. In each figure B, a view of the power switch 3 as viewed in arrow D direction is also illustrated. Note that the following description refers to only the number of the figure without letter A or B when it is not necessary to distinguish between figures A and B.

As shown in FIG. 6, when the inner cylinder 50b of the cylinder lock 50 is at the unlocked position, the smallest-radius portion 61e of the rotating cam 61b is in contact with the upper end surface of the locking shaft 62a. In this state, the lower end of the locking shaft 62a is housed within the through hole 122e formed in the sheet feed cassette 12 of the standard sheet feeder 10. Thus, the sheet feed cassette 22 of the optional sheet feeder 20 is in an unlocked state in which the sheet feed cassette 22 is not locked by the locking shaft 62a.

Figure 6A:
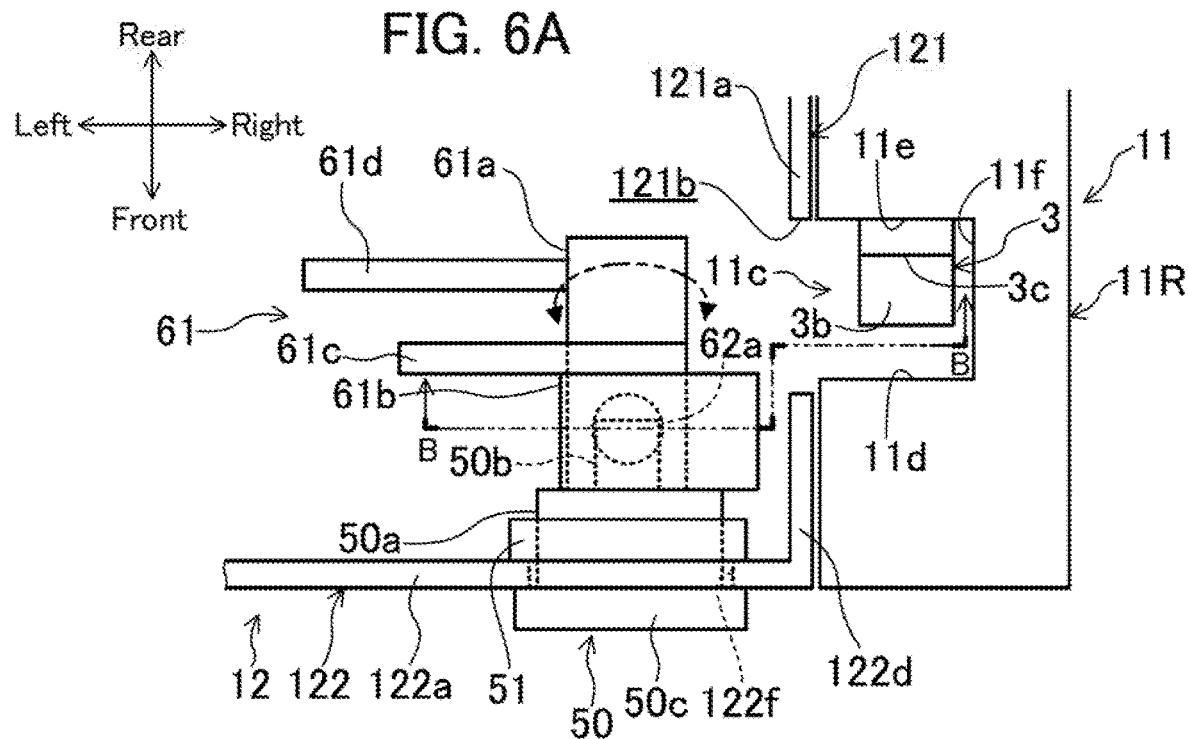
FIG. 6A is a sectional view taken along line A-A in FIG. 1, which shows a state where the inner cylinder of the cylinder lock is at an unlocked position.
Figure 6B:
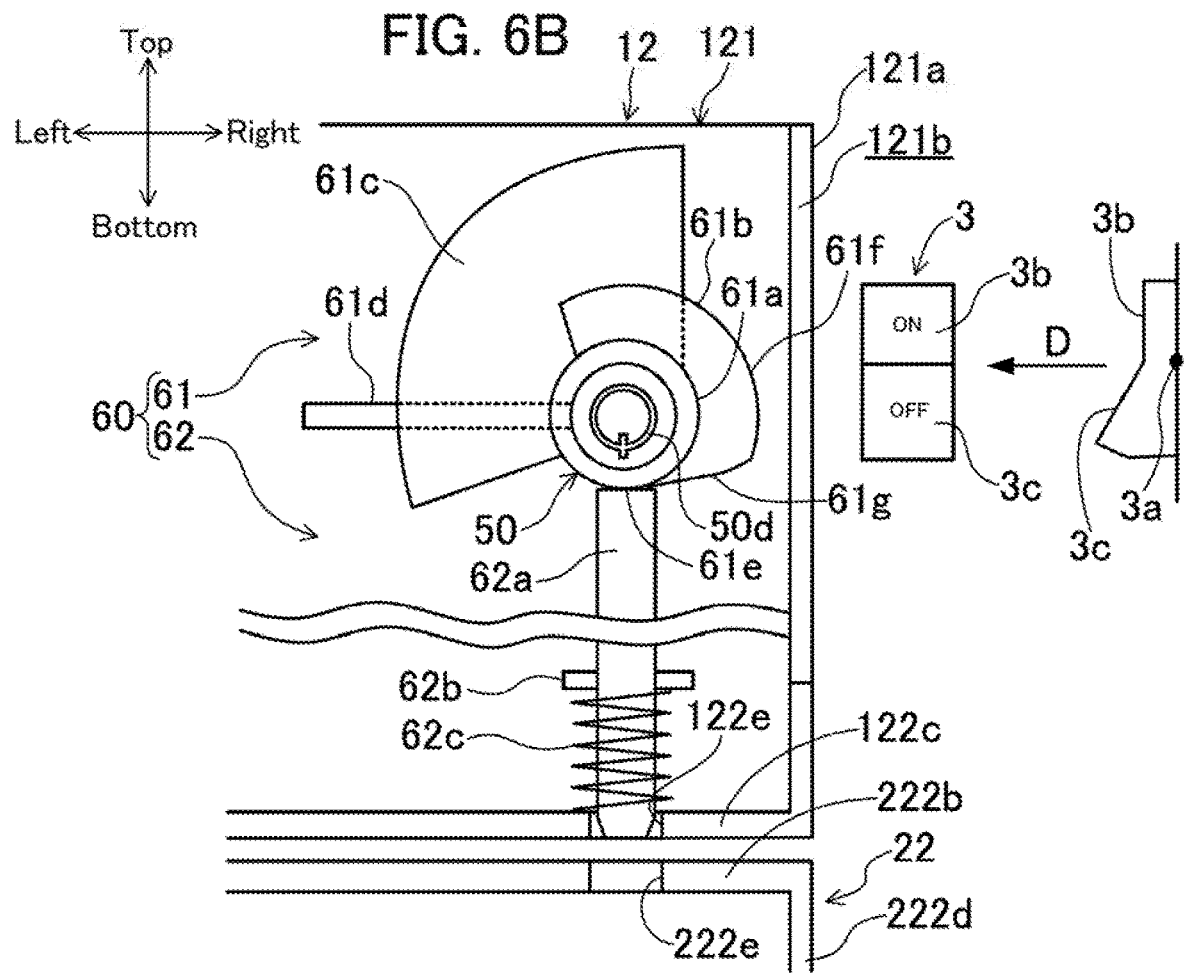
FIG. 6B is a sectional view taken along line B-B in FIG. 6A.

Further, when the inner cylinder 50b of the cylinder lock 50 is at the unlocked position, the locking plate 61c is positioned at the left side (outer side) of the switch receiving recess 11c of the body case 11 of the standard sheet feeder 10 (see FIG. 6A). Thus, the sheet feed cassette 12 of the standard sheet feeder 10 is in an unlocked state in which the sheet feed cassette 12 is not locked by the locking plate 61c so that the sheet feed caseate 12 can be pulled out to the front side.

Furthermore, when the inner cylinder 50b of the cylinder lock 50 is at the unlocked position (see FIG. 6), the switch switching bar 61d extends to the left side (i.e., the side opposite to the power switch 3) from the peripheral surface of the coupling shaft 61a, so that the switch switching bar 61d is not in contact with the power switch 3. In this state, the power switch 3 is kept in the ON state.

Summarizing the above, when the inner cylinder 50b of the cylinder lock 50 is at the unlocked position (see FIG. 6), both the sheet feed cassette 12 of the standard sheet feeder 10 and the sheet feed cassette 22 of the optional sheet feeder 20 are in the unlocked state and the power switch 3 is in the ON state.

When a user inserts the key 52 into the keyhole 50d of the inner cylinder 50b in the state shown in FIG. 6 and turns the key 52 by 90° in the clockwise direction, the inner cylinder 50b is turned to the intermediate position (see FIG. 7). During this turning of the inner cylinder 50b to the intermediate position, the coupling shaft 61a and the rotating cam 61b rotate in the clockwise direction along with the inner cylinder 50b of the cylinder lock 50, which causes the rotating cam 61b to press the locking shaft 62a downward. When the inner cylinder 50b reaches the intermediate position, the largest-radius portion 61f of the rotating cam 61b is brought into contact with the upper end surface of the locking shaft 62a and thereby the locking shaft 62a is pressed down to a locking position (the position shown in FIG. 7). When the locking shaft 62a reaches the locking position, the lower end of the locking shaft 62a engages the engagement hole 222e of the sheet feed cassette 22 of the optional sheet feeder 20 so that the sheet feed cassette 22 is brought into a locked state in which the sheet feed cassette 22 cannot be pulled out to the front side.

Further, when the inner cylinder 50b of the cylinder lock 50 is turned to the intermediate position (see FIG. 7), the locking plate 61c rotates by 90° in the clockwise direction from the state shown in FIG. 6 along with the coupling shaft 61a, so that the right end portion of the locking plate 61c engages the front wall 11d of the switch receiving recess 11c (example of the engaged portion) as shown in FIG. 7A. Thereby, the sheet feed cassette 12 of the standard sheet feeder 10 is brought into a locked state in which the sheet feed cassette 12 is locked by the locking plate 61c so that the sheet feed cassette 12 cannot be pulled out to the front side.

Furthermore, when the inner cylinder 50b of the cylinder lock 50 is turned to the intermediate position (see FIG. 7), the switch switching bar 61d rotates by 90° in the clockwise direction from the state shown in FIG. 6 along with the coupling shaft 61a. As a result of this rotation, the switch switching bar 61d extends upward from the peripheral surface of the coupling shaft 61a as shown in FIG. 7B, so that the switch switching bar 61d is still not in contact with the power switch 3. Thus, the power switch 3 is kept in the ON state.

Summarizing the above, when the inner cylinder 50b of the cylinder lock 50 is at the intermediate position, both the sheet feed cassette 12 of the standard sheet feeder 10 and the sheet feed cassette 22 of the optional sheet feeder 20 are in the locked state and the power switch 3 is in the ON state.

When a user inserts the key 52 into the keyhole 50d of the inner cylinder 50b in the state shown in FIG. 7 and rotates the key 52 by 90° in the clockwise direction, the inner cylinder 50b is turned to the locked position (see FIG. 8). During this turning of the inner cylinder 50b to the locked position, the coupling shaft 61a and the rotating cam 61b rotate in the clockwise direction along with the inner cylinder 50b of the cylinder lock 50. The rotating cam 61b has the large-diameter part 61f that extends over an angle of 90° or more in the circumferential direction; therefore, a peripheral surface of the largest-radius part 61f keeps in contact with the upper end surface of the locking shaft 62a while the inner cylinder 50b is turned from the intermediate position to the locked position. Thus, the locking shaft 62a is maintained at the locking position without changing in its vertical position, so that the sheet feed cassette 22 of the optional sheet feeder 20 is kept in the locked state.

Further, when the inner cylinder 50b of the cylinder lock 50 is turned to the locked position (see FIG. 8), the locking plate 61c rotates by another 90° in the clockwise direction from the state shown in FIG. 7 along with the coupling shaft 61a. However, the engagement of the right end portion of the locking plate 61c with the front wall 11d of the switch receiving recess 11c is maintained as shown in FIG. 8A. Accordingly, the sheet feed cassette 12 of the standard sheet feed cassette 10 is kept in the locked state.

Furthermore, when the inner cylinder 50b of the cylinder lock 50 is turned to the locked position, the switch switching bar 61d is brought into contact with the OFF-side pressed surface 3c of the power switch 3 as shown in FIG. 8B so that the power switch 3 is turned from the ON state into the OFF state.

Summarizing the above, the inner cylinder 50b of the cylinder lock 50 is turned to the locked position, both the sheet feed cassette 12 of the standard sheet feeder 10 and the sheet feed cassette 22 of the optional sheet feeder 20 are brought into the locked state and the power switch 3 is brought into the OFF state.

The foregoing description has described how the interlocking mechanism 60 operates when the inner cylinder 50b of the cylinder lock 50 is turned from the unlocked position to the locked position. As for when the inner cylinder 50b is turned from the locked position to the unlocked position, the interlocking mechanism 60 operates basically in the same manner as described above, except that the turning unit 61 including the coupling shaft 61a rotates in the counterclockwise direction; therefore, detailed description thereof is omitted.

As described above, the switch switching bar 61d of the turning unit 61 in this embodiment is configured to switch the power switch 3 such that the power switch 3 is in the ON state when the inner cylinder 50b of the cylinder lock 50 is at the unlocked position (the state shown in FIG. 6), and the power switch 3 is in the OFF state when the inner cylinder 50b is at the locked position (the state shown in FIG. 8). Further, the locking plate 61c of the turning unit 61 is configured to place the sheet feed cassette 12 of the standard sheet feeder 10 in the unlocked state when the inner cylinder 50b of the cylinder lock 50 is at the unlocked position (the state shown in FIG. 6) and place the sheet feed cassette 12 in the locked state when the inner cylinder 50b is at the locked position (the state shown in FIG. 8).

With this configuration, when a user turns the inner cylinder 50b of the cylinder lock 50 from the unlocked position to the locked position, the switch switching bar 61d switches the power switch 3 from the ON state to the OFF state and the locking bar 61c switches the sheet feed cassette 12 into the locked state.

Therefore, the user's failure to lock the sheet feed cassette 12 is minimized. That is to say, a user usually turns off the power switch of his/her image forming apparatus when leaving the image forming apparatus for a long period of time, such as when leaving his/her office for home or for a long vacation. Taking this into consideration, the image forming apparatus 1 according to this embodiment is configured such that the switching of the sheet feed cassette 12 from the unlocked state to the locked state takes place in conjunction with the switching of the power switch 3 from the ON state to the OFF state; therefore, the image forming apparatus 1 minimizes failure to lock the sheet feed cassette 12. Consequently, theft of sheets from the sheet feed cassette 12 caused by the failure to lock the sheet feed cassette 12 and unintended ejection of the sheet feed cassette 12 caused by vibration in conveyance are prevented.

Further, the sheet feed cassette 12 of the standard sheet feeder 10 in this embodiment has a cam mechanism provided thereon. The cam mechanism includes the rotating cam 61b and the biasing member 62c that presses the upper end surface of the locking shaft 62a against the peripheral surface of the rotating cam 61b. The cam mechanism is configured such that the locking shaft 62a is positioned at the unlocking position when the inner cylinder 50b of the cylinder lock 50 is at the unlocked position (the state shown in FIG. 6), and the locking shaft 62a is positioned at the locking position when the inner cylinder 50b is at the locked position (the state shown in FIG. 8). When positioned at the locking position, the locking shaft 62a engages with the engagement hole 222e of the sheet feed cassette 22 of the optional sheet feeder 20 so that the sheet feed cassette 22 is locked such that it is cannot be pulled out.

With this configuration, when the inner cylinder 50b of the cylinder lock 50 is turned to the locked position by the key 52, not only is the sheet feed cassette 12 of the standard sheet feeder 10 locked by the locking plate 61c, but also is the sheet feed cassette 22 of the optional sheet feeder 20 locked by the locking shaft 62a such that the sheet feed cassette 22 cannot be pulled out. Therefore, failure to lock the sheet feed cassette 22 of the optional sheet feeder 20 is also prevented.

Further, the switch switching bar 61d in this embodiment is configured to switch the power switch 3 such that the power switch 3 is in the ON state when the inner cylinder 50b of the cylinder lock 50 is at the intermediate position (the state shown in FIG. 7). The rotating cam 61b is configured to place the standard sheet feeder 10 in the locked state when the inner cylinder 50b of the cylinder lock 50 is at the intermediate position. Further, the aforementioned cam mechanism is configured such that the locking shaft 62a is positioned at the locking position when the inner cylinder 50b of the cylinder lock 50 is at the intermediate position.

With this configuration, turning the inner cylinder 50b of the cylinder lock 50 to the intermediate position by means of the key 52 causes the power switch 3 to be switched into the ON state and causes the sheet feed cassette 12 of the standard sheet feeder 10 and the sheet feed cassette 22 of the optional sheet feeder 20 to be locked such that they cannot be pulled out. Therefore, the user is prevented from accidentally pulling out the sheet feed cassette 12 or 22 in the middle of execution of the printing process in the image forming apparatus 1.

Further, the power switch 3 in this embodiment has the support shaft 3a and is configured to be switchable between the ON state and the OFF state by seesawing about the support shaft 3a. The switch switching bar 61d is configured to switch the power switch 3 by, in conjunction with the inner cylinder 50b of the cylinder lock 50 being turned by the key 52, coming into contact with the pressed surface (the ON-side pressed surface 3b or the OFF-side pressed surface 3c) of the power switch 3 and causing the power switch 3 to seesaw.

Other Embodiments

In the above-described embodiment, the sheet feed cassette 12 of the standard sheet feeder 10 is locked by engaging the right end portion of the locking plate 61c with the front wall 11d of the switch receiving recess 11c; however, the present disclosure is not limited thereto. For example, a configuration is possible in which a powerful magnet is used instead of the locking plate 61c and the sheet feed cassette 12 is locked by a magnetic attraction force applied thereto from a permanent magnet provided inside the body case 11.

What is claimed is:

1. An image forming apparatus, comprising:
an image forming apparatus body having a power switch;
a sheet feed cassette housed in the image forming apparatus body such that the sheet feed cassette is able to be pulled out from the image forming apparatus body;
an outer cylinder forming a part of a cylinder lock, the outer cylinder being mounted on a wall of the sheet feed cassette located on a front side in a pulled-out direction of the sheet feed cassette;
an inner cylinder rotatably held in the outer cylinder and configured to be rotated between a first position and a second position about an axis of the outer cylinder by a key inserted into the inner cylinder from the front side in the pulled-out direction; and
a turning unit coupled to the inner cylinder inside the sheet feed cassette such that the turning unit is able to rotate integrally with the inner cylinder,
wherein:
the turning unit includes:
  a switch switching part configured to turn in conjunction with rotational motion of the inner cylinder rotated by the key to switch the power switch between an ON state for supplying power to the image forming apparatus body and an OFF state for stopping supply of power to the image forming apparatus body; and
  a cassette locking part configured to turn in conjunction with rotational motion of the inner cylinder rotated by the key to switch the sheet feed cassette between a locked state in which the sheet feed cassette is locked such that it cannot be pulled out from the image forming apparatus body and an unlocked state in which the sheet feed cassette is unlocked;
the switch switching part is configured to switch the power switch such that the power switch is in the ON state when the inner cylinder is at the first position, and the power switch is in the OFF state when the inner cylinder is at the second position; and
the cassette locking part is configured to place the sheet feed cassette in the unlocked state when the inner cylinder is at the first position and place the sheet feed cassette in the locked state when the inner cylinder is at the second position.

2. The image forming apparatus of claim 1, wherein the cassette locking part is configured to place the sheet feed cassette into the locked state by engaging an engaged portion provided on the image forming apparatus body and place the sheet feed cassette into the unlocked state by disengaging from the engaged portion.

3. The image forming apparatus of claim 1, wherein:
the sheet feed cassette is a sheet feed cassette of a standard sheet feeder undetachably mounted at a bottom end of the image forming apparatus body;
an optional sheet feeder is detachably attached to a bottom of the image forming apparatus body, the optional sheet feeder including a sheet feed cassette configured to be able to be pulled out;
the sheet feed cassette of the standard sheet feeder has provided thereon a locking shaft extending vertically, and a cam mechanism configured to, in conjunction with turning motion of the turning unit, move the locking shaft vertically between a locking position for causing the locking shaft to engage an engaged portion provided on the sheet feed cassette of the optional sheet feeder to lock the sheet feed cassette of the optional sheet feeder such that the sheet feed cassette of the optional sheet feeder cannot be pulled out and a unlocking position for unlocking the sheet feed cassette of the optional sheet feeder; and
the cam mechanism is configured to position the locking shaft at the unlocking position when the inner cylinder is at the first position and position the locking shaft at the locking position when the inner cylinder is at the second position.

4. The image forming apparatus of claim 3, wherein:
the switch switching part is configured to switch the power switch such that the power switch is in the ON state when the inner cylinder is at a predetermined intermediate position located between the first position and the second position;
the cassette locking part is configured to place the sheet feed cassette of the standard sheet feeder in the locked state when the inner cylinder is at the predetermined intermediate position; and
the cam mechanism is configured to position the locking shaft at the locking position when the inner cylinder is at the predetermined intermediate position.

5. The image forming apparatus of claim 1, wherein:
the power switch has a support shaft and is configured to be switchable between the ON state and the OFF state by seesawing about the support shaft; and
the switch switching part is configured to turn in conjunction with rotational motion of the inner cylinder rotated by the key and thereby come into contact with a pressed surface of the power switch and cause the power switch to seesaw, thereby switching the power switch.

* * * * *